Aug. 12, 1958

W. PATTON 2,846,743

AUTOMOBILE MOLDING CLIP

Filed Aug. 1, 1956

Woodie Patton
INVENTOR.

BY *Clarence A. O'Brien*
*and Harvey B. Jacobson*
Attorneys

United States Patent Office 2,846,743
Patented Aug. 12, 1958

2,846,743

AUTOMOBILE MOLDING CLIP

Woodie Patton, Concord, Calif.

Application August 1, 1956, Serial No. 601,449

3 Claims. (Cl. 24—73)

The present invention relates to new and useful improvements in automobile molding fasteners or clips and has for its primary object to provide, in a manner as hereinafter set forth, a device of this character which may be readily adjusted for use on moldings of various widths.

Another very important object of the invention is to provide an adjustable fastener or clip of the aforementioned character comprising novel jaws for engaging and anchoring the usual inturned flanges of the moldings.

Other objects of the invention are to provide an adjustable automobile molding fastener or clip of the character set forth which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
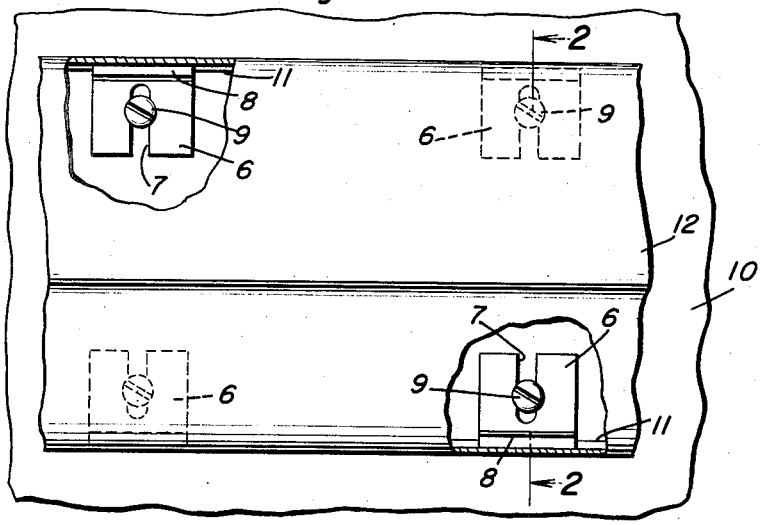
Figure 1 is a view in front elevation, partially in section, showing a plurality of fasteners or clips embodying the present invention in use for securing a wide molding in position on a vehicle body.
Figure 2:
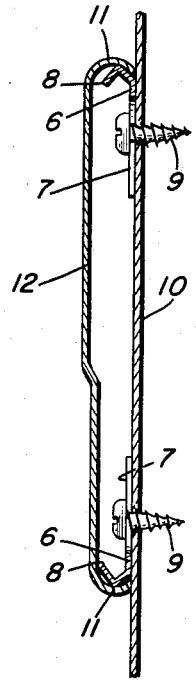
Figure 2 is a view in transverse section, taken substantially on the line 2—2 of Figure 1.

Referring now to the drawing in detail, it will be seen that the embodiment of the invention which has been illustrated comprises a pair of plates 6 of resilient sheet metal or other suitable material. Extending into the plates 6 from the inner ends thereof are slots 7. The outer or other end portions of the plates 6 are angulated in a manner to provide a pair of opposed, substantially U-shaped jaws 8.

The slots 7 are for the reception of metal screws 9 for adjustably securing the plates 6 on an automobile body, as indicated at 10. The jaws 8 are engageable in the usual inturned longitudinal marginal flanges 11 of arcuate transverse section of a strip of molding 12 for mounting said molding on the body 10.

It is thought that the use of the invention will be readily apparent from a consideration of the foregoing.

Briefly, the plates 6 are mounted on the automobile body 10 and secured in adjusted position through the medium of the screws 9. The flanges 11 of the molding 12 are then snapped over the substantially U-shaped jaws 8 in an obvious manner for firmly securing said molding on the vehicle.

Figure 3:
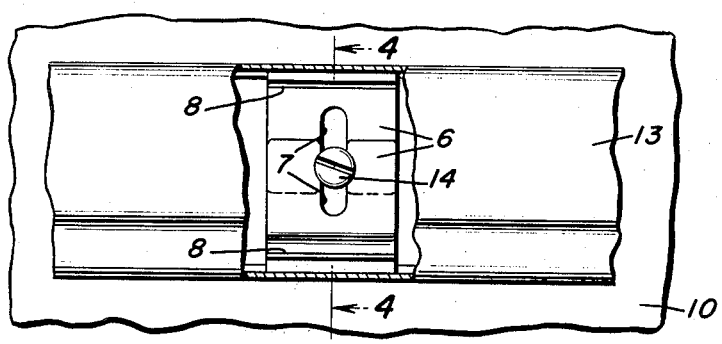
Figure 3 is a view in elevation, partially in section, showing the device in use on a relatively narrow molding.
Figure 4:
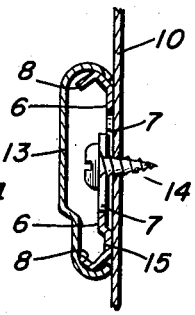
Figure 4 is a view in transverse section, taken substantially on the line 4—4 of Figure 3.
Figure 5:
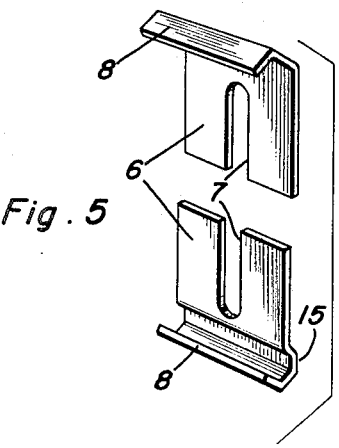
Figure 5 is a perspective view of the device.

In the installation shown in Figures 3 and 4 of the drawing, reference character 13 designates a comparatively narrow strip of molding to be mounted on the vehicle body. Toward this end, the inner end portions of the plates 6 are lapped and a single screw 14 is inserted through the communicating slots 7 for securing the plates 6 in adjusted position on the body. In this arrangement one of the plates 6 is provided with an inwardly offset outer end portion 15 which is engageable with the body and which compensates for the thickness of the other plate which is interposed between said one plate and said body. The construction and arrangement of parts, it will be observed, is such that the plates 6 may also be rotatably adjusted to accommodate longitudinally tapered moldings.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A clip for securing molding of the type comprising marginal flanges to an automobile body, said clip including a pair of upper and lower plates having vertical slots therein for the reception of fastening means for adjustably mounted said plates on the body, and outturned jaws on the upper and lower ends of the plates engageable in the flanges.

2. A clip for securing a molding of the type including longitudinal marginal inturned flanges on a vehicle body, said clip comprising: a pair of spaced, vertically aligned plates engaged with the body, said plates having vertical slots therein for the reception of screws for adjustably securing said plates to said body, and substantially V-shaped jaws on the outer ends of the plates frictionally engageable with the flanges for securing the molding on the body.

3. A mounting clip for vehicle body moldings of the type comprising inturned longitudinal marginal flanges of arcuate transverse section, said clip comprising: a pair of upper and lower plates having their adjacent end portions lapped, said plates adapted to be mounted for engagement with the body, said plates having vertical slots extending thereinto from the adjacent ends thereof for the reception of a screw for adjustably mounting said plates on said body, one of said plates including an inwardly offset end portion for abutting engagement with the body, and substantially V-shaped jaws on the other ends of the plates frictionally engageable in the flanges for securing the molding to the body.

References Cited in the file of this patent

UNITED STATES PATENTS

| 2,460,722 | Waara | Feb. 1, 1949 |
| 2,748,840 | Poupitch | June 5, 1956 |